United States Patent [19]
Engel

[11] Patent Number: 5,310,151
[45] Date of Patent: May 10, 1994

[54] LANTERN HANGER DEVICE

[76] Inventor: Stephen J. Engel, 502 Kingston Dr., Romeoville, Ill. 60441

[21] Appl. No.: 44,764

[22] Filed: Apr. 12, 1993

[51] Int. Cl.⁵ .............................................. A47B 96/06
[52] U.S. Cl. .................................. 248/231; 248/219.4
[58] Field of Search ...................... 248/231, 230, 219.4, 248/218.4, 219.1; 362/431, 396; 182/187; 211/107, 110, 111

[56] References Cited
U.S. PATENT DOCUMENTS

| 3,746,294 | 7/1973 | Johnston | 248/231 X |
| 3,785,604 | 1/1974 | Steck | 248/231 |
| 4,409,907 | 10/1983 | Norton | 248/231 X |
| 4,744,537 | 5/1988 | Buckley | 248/219.4 X |

Primary Examiner—Ramon O. Ramirez
Attorney, Agent, or Firm—Leon Gilden

[57] ABSTRACT

A lantern hanger is arranged for mounting about an exterior periphery of an available tree in a camping environment, with telescoping tubes projecting from a forward wall of the support housing, with an outermost tube arranged to accommodate a lantern thereon.

3 Claims, 5 Drawing Sheets

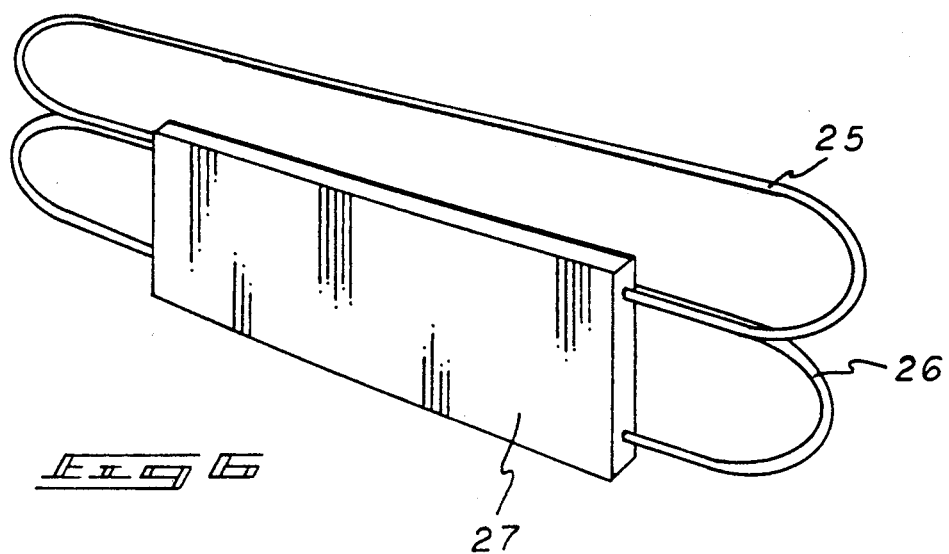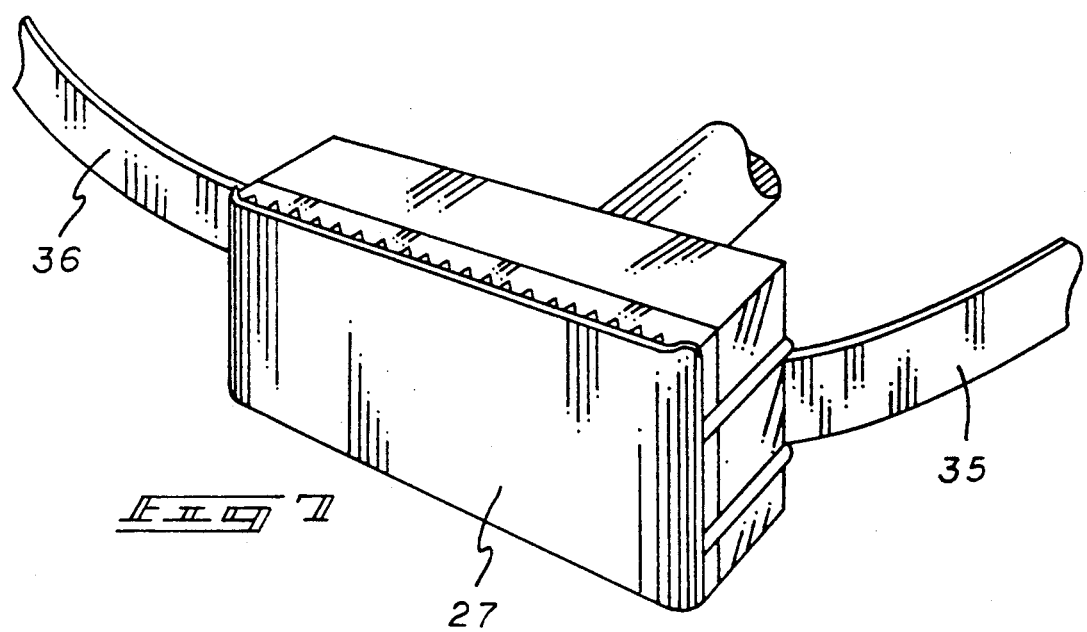

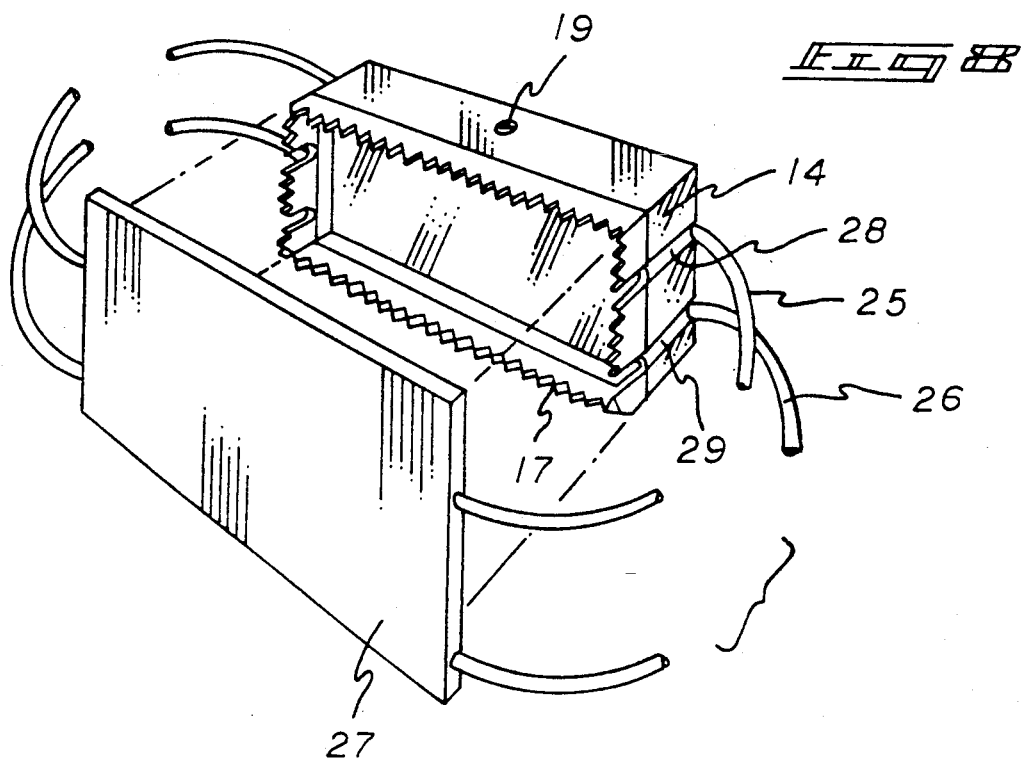
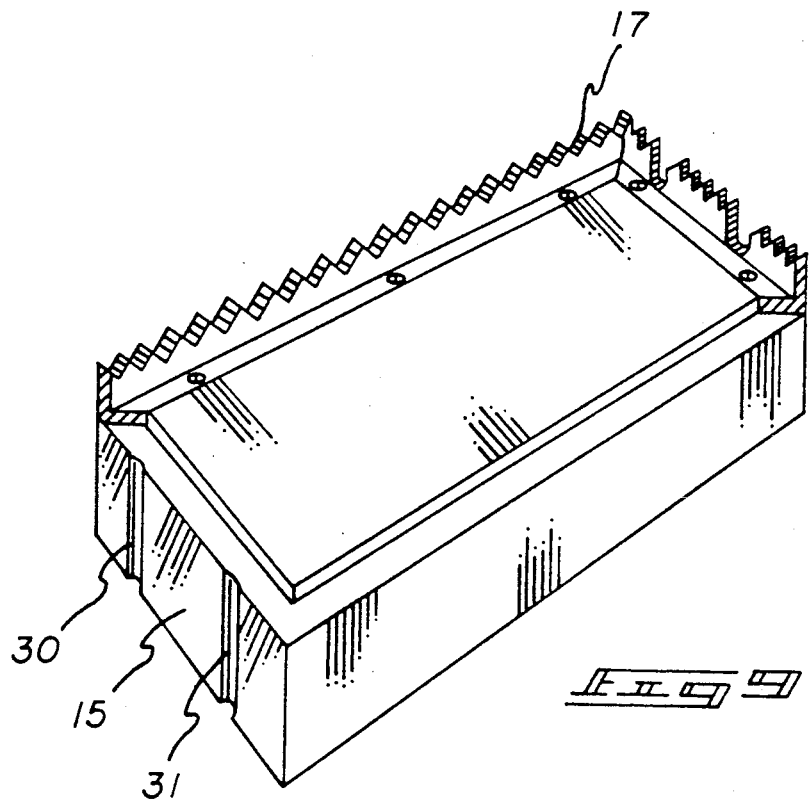

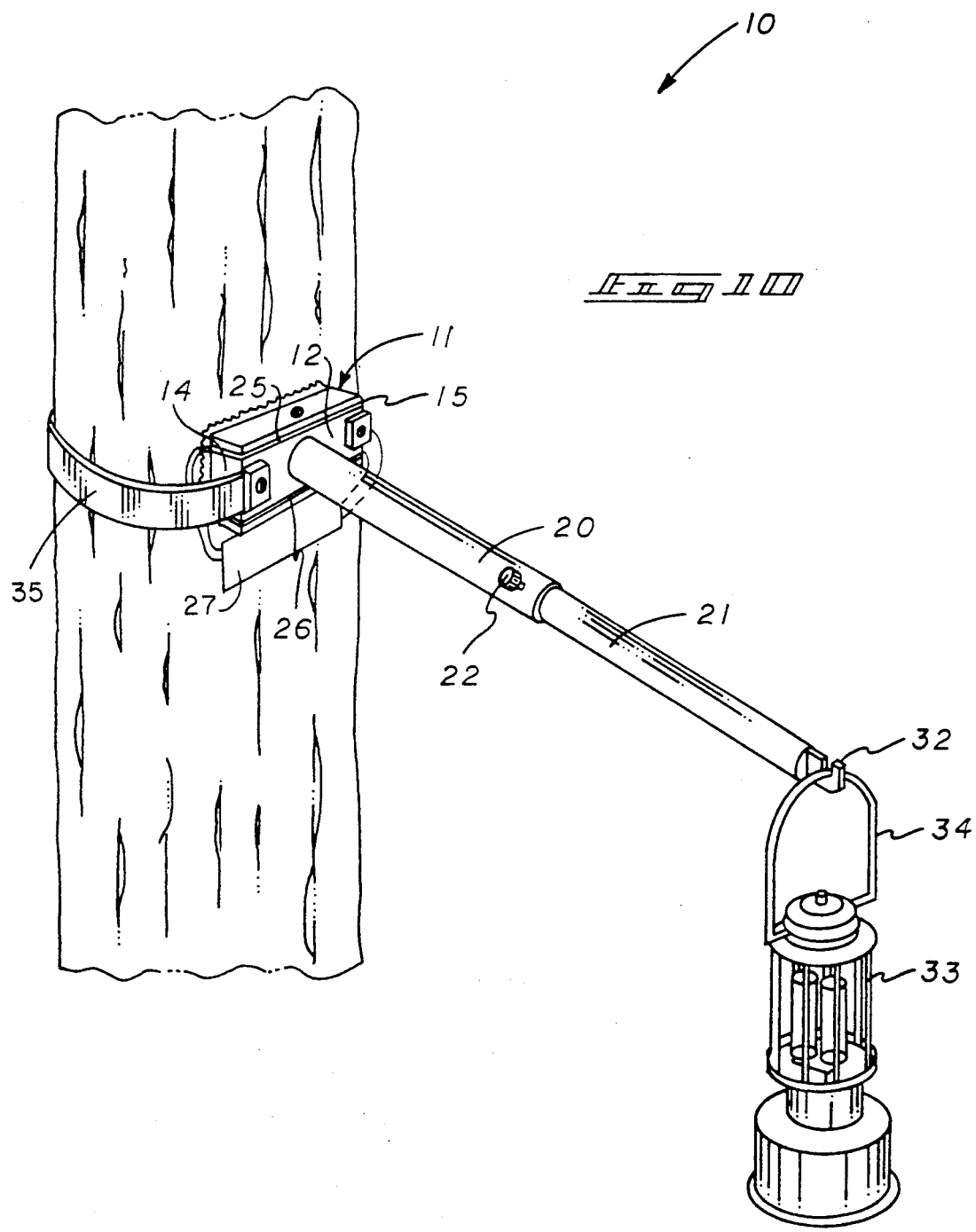

LANTERN HANGER DEVICE

BACKGROUND OF THE INVENTION

1. Field of the Invention

The field of invention relates to lantern hanger structure, and more particularly pertains to a new and improved lantern hanger device wherein the same is arranged to permit ease of mounting of a lantern hanger structure relative to a tree and the like.

2. Description of the Prior Art

Lantern hanger structure is available in the prior art and exemplified by the U.S. Pat. No. 3,746,294 utilizing a V-shaped base and a surrounding chain structure to secure the bracket arrangement relative to a tree.

The instant invention attempts to overcome deficiencies of the prior art by providing for cooperating bands utilizing a hook and loop fastener surface for permitting securement of the bands about a tree and in this respect, the present invention substantially fulfills this need.

SUMMARY OF THE INVENTION

In view of the foregoing disadvantages inherent in the known types of lantern hanger apparatus now present in the prior art, the present invention provides a lantern hanger device wherein the same is arranged to include telescoping tubes readily removed relative to a base for ease of transport and storage of the organization during periods of non-use. As such, the general purpose of the present invention, which will be described subsequently in greater detail, is to provide a new and improved lantern hanger device which has all the advantages of the prior art lantern hanger apparatus and none of the disadvantages.

To attain this, the present invention provides a lantern hanger arranged for mounting about an exterior periphery of an available tree in a camping environment, with telescoping tubes projecting from a forward wall of the support housing, with an outermost tube arranged to accommodate a lantern thereon.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved lantern hanger device which has all the advantages of the prior art lantern hanger apparatus and none of the disadvantages.

It is another object of the present invention to provide a new and improved lantern hanger device which may be easily and efficiently manufactured and marketed.

It is a further object of the present invention to provide a new and improved lantern hanger device which is of a durable and reliable construction.

An even further object of the present invention is to provide a new and improved lantern hanger device which is susceptible of a low cost of manufacture with regard to both materials and labor, and which accordingly is then susceptible of low prices of sale to the consuming public, thereby making such lantern hanger devices economically available to the buying public.

Still yet another object of the present invention is to provide a new and improved lantern hanger device which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is an isometric illustration of the band structure relative to the housing of the instant invention.

FIG. 6 is an isometric illustration of a guard plate for use by the invention during periods of storage.

FIG. 7 is an isometric illustration of the guard plate in use.

FIG. 8 is an isometric illustration of the guard plate arranged in a spaced relationship relative to the housing.

FIG. 9 is an isometric view of the housing indicating the use of the grooved second side wall.

FIG. 10 is an isometric illustration of the invention indicating the displacement of the guard plate relative to the housing during mounting to a tree.

DESCRIPTION OF THE PREFERRED EMBODIMENT

Figure 1:
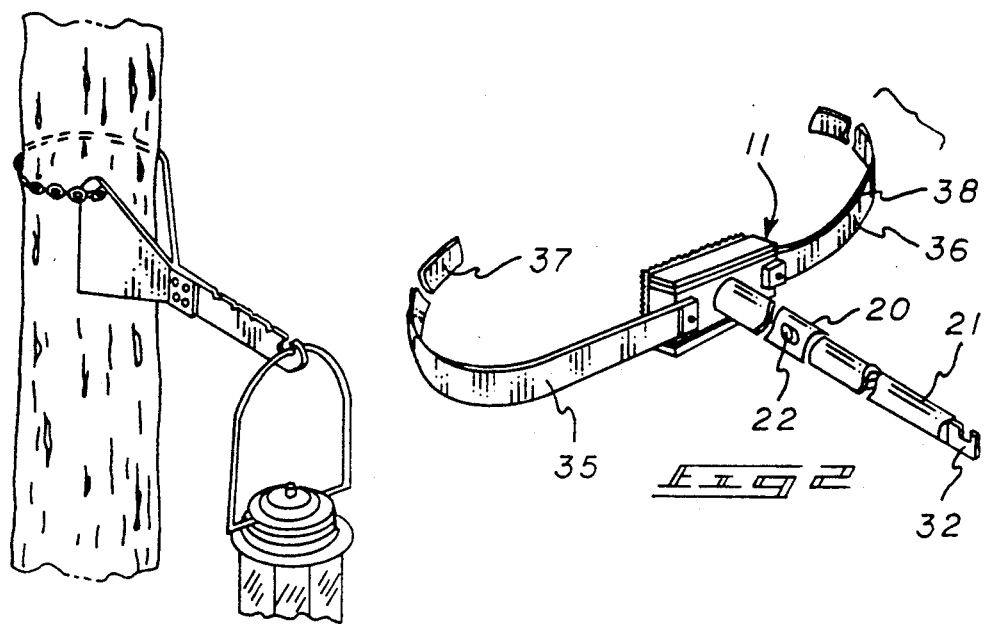
FIG. 1 is an isometric illustration of a prior art lantern structure, as indicated in U.S. Pat. No. 3,746,294.
Figure 3:
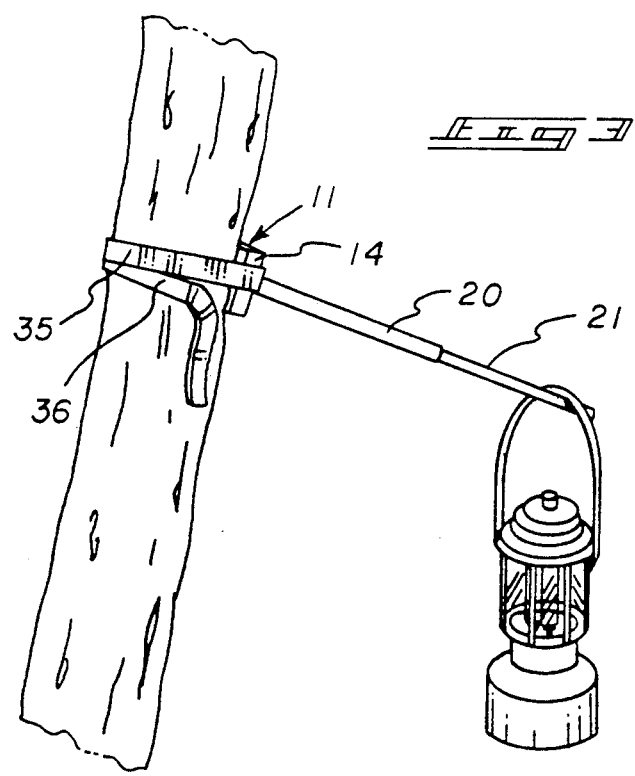
FIG. 3 is an isometric illustration of the invention mounted to an associated tree structure.
Figure 4:
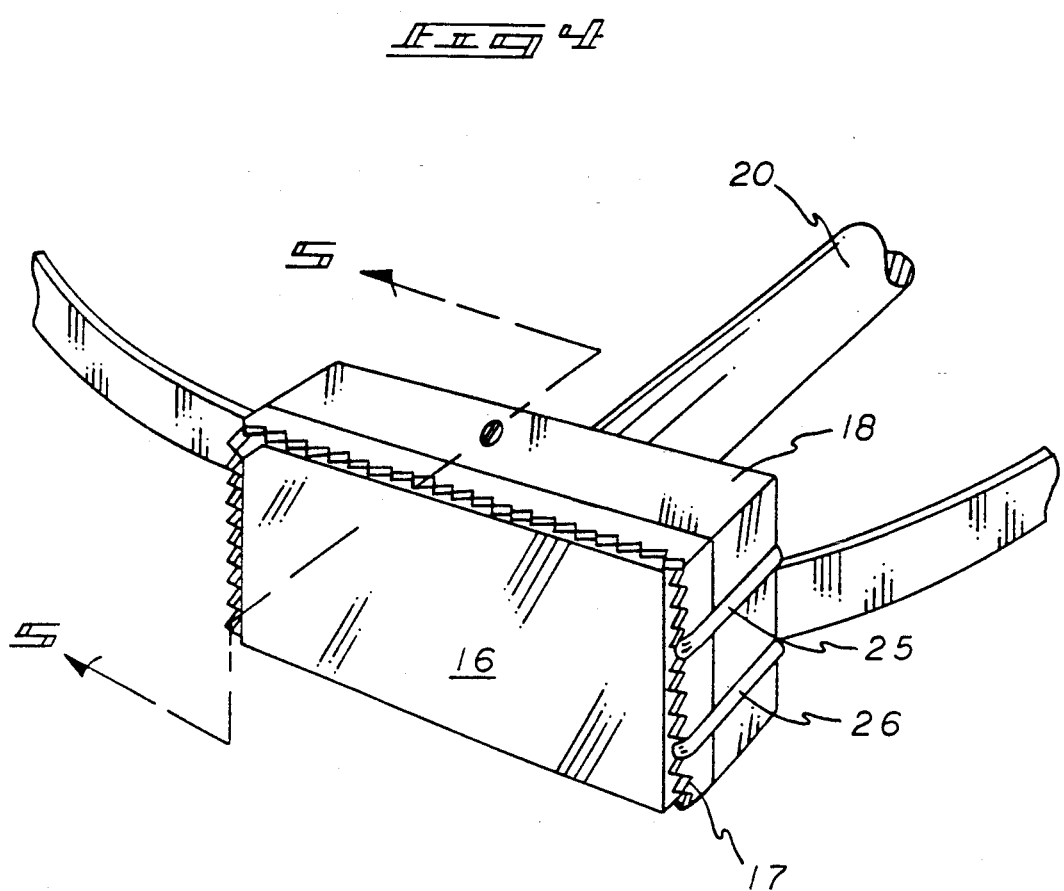
FIG. 4 is an isometric rear view of the invention.
Figure 5:
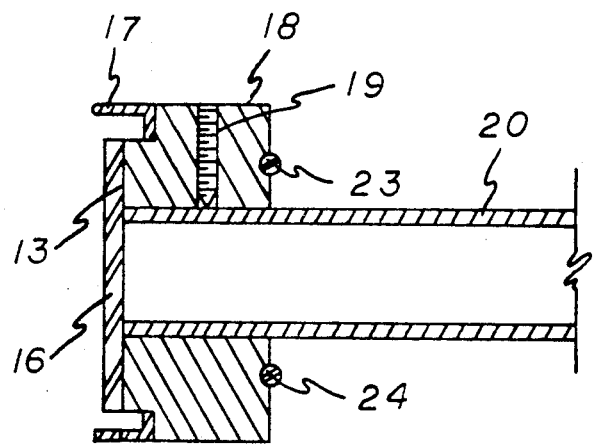
FIG. 5 is an orthographic view, taken along the lines 5—5 of FIG. 4 in the direction indicated by the arrows.

With reference now to the drawings, and in particular to FIGS. 1 to 10 thereof, a new and improved lantern hanger device embodying the principles and concepts of the present invention and generally designated by the reference numeral 10 will be described.

More specifically, the lantern hanger device 10 of the instant invention essentially comprises a support housing 11, having a front wall 12 spaced from a rear wall 13, first and second spaced side walls 14 and 15 respectively, as well as a top wall 18. A cushion layer 16 is mounted to the rear wall 13, with a continuous periphery of engaging teeth 17 of a saw-toothed configuration mounted about the periphery of the rear wall to engage a tree structure, wherein the cushion layer 16 limits displacement relative to the tree and slippage minimizing damage to the tree surface. Further, it is understood that the saw teeth 17 may include a polymeric coating to further minimize damage to an associated tree surface.

The top wall 18 includes a fastener rod 19 threadedly directed into the housing 11 directed through the top wall for engagement with a base tube 20 received within the housing, with the base tube 20 extending from the front wall 12 in an orthogonal relationship. The base tube 20 includes an extension tube 21 telescopingly mounted relative to the base tube 20, with a base tube lock fastener 22 threadedly directed through the base tube 20 for engagement with an extension tube 21. The base and extension tubes 20 and 21, as well as the support housing 11 are arranged for separation relative to one another by use of the associated fasteners 19 and 22. The extension tube 21 further includes an extension tube hook member 32 to support a lantern 33 about a lantern bail 34. First and second straps 35 and 36 mounted to the respective first and second side walls 14 and 15 extend therefrom for engagement about the tree and employ respective first and second hook and loop fastener surfaces 37 and 38 for engagement relative to one another to permit accommodation of various dimensions of trees.

The front wall 12 includes front wall first and second grooves 23 and 24 that are arranged in a parallel relationship, and with the front wall first groove 23 extending into first and second side wall first grooves 28 and 30 respectively, while the front wall second grooves 24 extend into first and second side wall second grooves 29 and 31. To this end, first and second elastomeric bands 25 and 26 are directed through the first grooves and the second grooves respectively of the front and side walls, with the first and second elastomeric rings 25 and 26 secured to a rigid guard plate 27, with the rigid guard plate arranged for mounting over the rear wall 12 extending beyond the teeth 17. In this manner, during storage and transport of the organization, inadvertent damage and injury is avoided relative to surrounding components, as well as personnel.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A lantern hanger device, comprising, a support housing, the support housing including a front wall spaced from a rear wall, a first side wall spaced from a second side wall, and at least a top wall, with the rear wall including continuous periphery of engaging teeth extending beyond the rear wall in a peripheral orientation relative to the rear wall, with the rear wall including a cushion layer extending within the engaging teeth for engagement of a tree surface, and a first strap mounted to the first side wall, a second strap mounted to the second side wall, the first strap including a first fastener, the second strap including a second fastener, with the first fastener and second fastener arranged for securement relative to one another, and the front wall including a base tube orthogonally mounted to the front wall, with the base tube including an extension tube telescopingly received within the base tube, and the base tube having a base tube lock fastener directed through the base tube for engagement with the extension tube, and the extension tube including an extension tube hook member, and a lantern having a lantern bail, with the lantern bail arranged for positioning upon the hook member.

2. A lantern hanger device as set forth in claim 1 wherein the top wall includes a top wall bore and a fastener rod threadedly directed through the top wall bore for engagement with the base tube permitting selective removal of the base tube relative to the support housing.

3. A lantern hanger device as set forth in claim 2 wherein the front wall includes a front wall first groove and a front wall second groove, the first side wall includes a first side wall first groove in communication with the front wall first groove, the second wall having a second wall first groove in engagement with the front wall first groove, and the first side wall including a first side wall second groove in communication with the front wall second groove, and the second side wall having a second side wall second groove in communication with the front wall second groove, and a first elastomeric member received within the front wall first groove and the first side wall first groove and the second side wall first groove, with a second elastomeric member received within the front wall second groove, the first side wall second groove, and the second side wall second groove, with the first elastomeric member and the second elastomeric member having a rigid guard plate, with the rigid guard plate arranged for mounting over the teeth during storage and transport, with the rigid guard plate arranged for displacement relative to the teeth upon engagement to said tree.

* * * * *